US012651588B2

(12) United States Patent
Choi et al.

(10) Patent No.: US 12,651,588 B2
(45) Date of Patent: Jun. 9, 2026

(54) EARPHONE WITH ANC AUTOMATICALLY BLOCKING FUNCTION AND METHOD FOR CONTROLLING THE SAME

(71) Applicant: PUKYONG NATIONAL UNIVERSITY INDUSTRY-UNIVERSITY COOPERATION FOUNDATION, Busan (KR)

(72) Inventors: Jun Ho Choi, Busan (KR); Ryun Seok Oh, Busan (KR); Ji Won Gu, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 286 days.

(21) Appl. No.: 17/987,332

(22) Filed: Nov. 15, 2022

(65) Prior Publication Data

US 2024/0005901 A1 Jan. 4, 2024

Related U.S. Application Data

(63) Continuation of application No. PCT/KR2022/014644, filed on Sep. 29, 2022.

(30) Foreign Application Priority Data

Jun. 30, 2022 (KR) ........................ 10-2022-0080697

(51) Int. Cl.
*G10K 11/178* (2006.01)
*H04R 1/10* (2006.01)

(52) U.S. Cl.
CPC .. *G10K 11/17837* (2018.01); *G10K 11/17823* (2018.01); *G10K 11/17854* (2018.01); *H04R 1/1083* (2013.01); *H04R 2460/01* (2013.01)

(58) Field of Classification Search
CPC ....... G10K 11/17837; G10K 11/17823; G10K 11/17854; G10K 11/17827; H04R 1/1083; H04R 2460/01
See application file for complete search history.

(56) References Cited

U.S. PATENT DOCUMENTS

| | | | | |
|---|---|---|---|---|
| 2018/0018143 | A1* | 1/2018 | Hong | H04R 1/1041 |
| 2018/0233125 | A1* | 8/2018 | Mitchell | G10L 25/78 |
| 2020/0135163 | A1* | 4/2020 | Lovitt | G10K 11/17827 |
| 2020/0329297 | A1* | 10/2020 | Dutt | G10L 15/187 |

FOREIGN PATENT DOCUMENTS

| | | | |
|---|---|---|---|
| KR | 10-2003-0009504 | A | 1/2003 |
| KR | 10-1357935 | B1 | 2/2014 |

(Continued)

OTHER PUBLICATIONS

Korean Office Action for related KR Application No. 10-2022-0080697 mailed Jul. 28, 2023 from Korean Intellectual Property Office.

(Continued)

*Primary Examiner* — Jason R Kurr
(74) *Attorney, Agent, or Firm* — Paratus Law Group, PLLC

(57) ABSTRACT

An earphone with an ANC automatic blocking function includes: a danger occurrence notification sound information registration unit registering and storing unique sound information of a danger occurrence notification sound certified by a public institution; an external sound recognition unit recognizing an external sound during operation of an ANC function; a sound information comparison analysis unit comparing sound information recognized by the exter- (Continued)

nal sound recognition unit with sound information registered in the danger occurrence notification sound information registration unit and analyzing and determining whether matching sound information exists; and an ANC function maintaining and blocking controller blocking the ANC function immediately when it is determined from an analysis result of the sound information comparison analysis unit that there exists sound information matching the sound information recognized by the external sound recognition unit.

10 Claims, 2 Drawing Sheets

(56) References Cited

FOREIGN PATENT DOCUMENTS

| | | | |
|---|---|---|---|
| KR | 10-2016-0028651 | A | 3/2016 |
| KR | 10-1604928 | B1 | 3/2016 |
| KR | 10-1729189 | B1 | 4/2017 |
| KR | 10-1926429 | B1 | 3/2019 |
| KR | 10-2020-0045311 | A | 5/2020 |
| KR | 10-2243044 | B1 | 4/2021 |

OTHER PUBLICATIONS

International Search Report for PCT/KR2022/014644 mailed Mar. 23, 2023 from Korean Intellectual Property Office.

* cited by examiner

EARPHONE WITH ANC AUTOMATICALLY BLOCKING FUNCTION AND METHOD FOR CONTROLLING THE SAME

CROSS-REFERENCE TO PRIOR APPLICATIONS

This application is a Continuation Application of PCT International Patent Application No. PCT/KR2022/014644 (filed on Sep. 29, 2022), which claims priority to Korean Patent Application No. 10-2022-0080697 (filed on Jun. 30, 2022), which are all hereby incorporated by reference in their entirety.

BACKGROUND

The present disclosure relates to an earphone ANC technology and, more particularly, to an earphone with an ANC automatic blocking function, which improves safety by automatically canceling the ANC function using unique sound information of a danger occurrence notification sound when the danger occurrence notification sound is generated from the outside during the operation of the ANC function, and a method for controlling the same.

In general, a user wears earphones to ensure that only the user hears the desired sound and that the sound does not disturb others. Another purpose of using an earphone is to block the ambient noise so that the user may hear only the desired sound clearly and cleanly.

With the development of mobile technology and the shift to the un-tact society, the number of people who listen to online lectures and music in various places is increasing.

In particular, listening to the sound in a stable manner may not be possible in places like a street, a subway train, a bus, and a library due to high background noise. Accordingly, Bluetooth earphones equipped with an Active Noise Control (ANC) function that cancels external noise flowing into the earphones were developed, allowing users to be immersed in listening to the sound without being disturbed in various environments.

On the other hand, the ANC function unconditionally blocks sounds, so that sounds notifying of the occurrence of danger, such as alarm sounds (e.g., a fire alarm, a disaster warning, an air raid warning, or a medical equipment alarm), warning sounds (horn blowing sounds of a vehicle such as a car, a bus, a bicycle, and a personal mobility platform; siren sounds of a police car or an ambulance; reverse driving sounds; failure alarms of industrial machines; failure alarms of household products; and a notification sound of danger (overheating of an induction oven, a gas range, and a microwave oven), and human and animal sounds (shouting or barking), may not be heard.

Meanwhile, only the techniques related to the attenuation of ambient noise are currently under development, and research is primarily focused on regulating the maximum output volume to prevent hearing loss. On the other hand, problems that arise when a user wears ANC earphones are not considered.

Also, studies related to the delay in the occupants' cognitive response to a fire alarm due to wearing earphones have yet to be conducted in the field of fire safety in buildings.

Apple's AirPods and Samsung's Buzz series, which currently have the largest market share in Korea, also provide an active noise-canceling function. However, the products recognize disaster messages, such as fire alarms and emergency broadcasts, as background noise and attempt to cancel out the messages. Thus, even if a user encounters a dangerous situation, there is no other way to remedy the situation due to using earphones.

Therefore, there is a demand for developing a new technology capable of protecting a user from a risk when the active noise canceling function is used.

PRIOR ART REFERENCES

Patents (Patent 1) Korean laid-open patent No. 10-2003-0009504
(Patent 2) Korean registered patent No. 10-1926429
(Patent 3) Korean laid-open patent No. 10-2016-0028651

SUMMARY

The present disclosure, which has been made to solve the problem of the earphone ANC technology of the prior art, provides an earphone with an ANC automatic blocking function, which improves safety by automatically canceling the ANC function using unique sound information of a danger occurrence notification sound when the danger occurrence notification sound is generated from the outside during the operation of the ANC function, and a method for controlling the same.

The present disclosure provides an earphone with an ANC automatic blocking function, which automatically turns off the noise-canceling function when a danger occurrence notification sound is collected and enables a user wearing the earphone with the noise-canceling function to respond to the danger occurrence notification sound efficiently and quickly at the occurrence of a disaster, and a method for controlling the same.

The present disclosure provides an earphone with an ANC automatic blocking function, which stops the possibility of casualties beforehand by automatically turning off the noise-canceling function when a danger occurrence notification sound is collected at the occurrence of a disaster and helps the user evacuate the disaster situation or follow the instructions of a fire safety manager, and a method for controlling the same.

The present disclosure provides an earphone with an ANC automatic blocking function, which improves technical reliability by verifying, through an electroencephalogram (EEG) experiment, the ANC automatic blocking function and a process for responding to a danger based on the pattern of brainwaves to a danger occurrence notification sound to which a human responds, and a method for controlling the same.

The present disclosure provides an earphone with an ANC automatic blocking function, which allows accurately extracting unique sound information (magnitude, frequency, and waveform) of a danger occurrence notification sound reflecting human psychology through a scientific and quantitative result based on actual fire situation settings and brainwave measurements and allows the extracted information to be used as reference data when related laws are enacted and revised, and a method for controlling the same.

Other technical objects of the present disclosure are not limited to those described above. Other technical objects not mentioned above may be understood clearly by those skilled in the art from the descriptions given below.

To achieve the objects above, an earphone with an ANC automatic blocking function according to the present disclosure comprises a danger occurrence notification sound information registration unit registering and storing unique sound information of a danger occurrence notification sound certified by a public institution; an external sound recognition unit recognizing an external sound during operation of an ANC function; a sound information comparison analysis unit comparing sound information recognized by the external sound recognition unit with sound information registered in the danger occurrence notification sound information registration unit and analyzing and determining whether matching sound information exists; and an ANC function maintaining and blocking controller blocking the ANC function immediately when it is determined from an analysis result of the sound information comparison analysis unit that there exists sound information matching the sound information recognized by the external sound recognition unit.

Here, the danger occurrence notification sound information registration unit and the sound information comparison analysis unit are installed in the earphone itself or installed in the main body of a device to which the earphone is connected and are driven by an application installed in the main body of the device.

And unique sound information of a danger occurrence notification sound certified by a public institution, which has to be newly registered through an application installed in the main body of a device, is automatically updated.

And the sound information includes magnitude, frequency, and waveform information.

And the sound information comparison analysis unit, to determine whether the sound information recognized by the external sound recognition unit matches the sound information registered in the danger occurrence notification sound information registration unit, sets a range for determining the degree of matching and determines that the two pieces of sound information match when the degree of matching lies within the set range.

And the sound information comparison analysis unit sets the magnitude of a setting value for maintaining and blocking the ANC function differently by entering volume and genre information of a sound currently output through an earphone; age and hearing capability information of an earphone user; residential environment information; brainwave information to a danger occurrence notification sound to which the user responds; and health status information.

To achieve another object, a method for controlling an earphone with an ANC automatic blocking function according to the present disclosure comprises identifying unique sound information of a danger occurrence notification sound by recognizing the danger occurrence notification sound by an external sound recognition unit when the danger occurrence notification sound is transmitted from the outside while the ANC function of the earphone is in use; comparing unique sound information of a danger occurrence notification sound identified by the sound information comparison analysis unit with the sound information registered in the danger occurrence notification sound information registration unit and determining the degree of matching; maintaining the ANC function of the earphone to be in operation when the degree of matching does not lie within a set range and temporarily stopping sound transmission of the earphone when the degree of matching lies within the set range.

Here, the sound information includes magnitude, frequency, and waveform information.

And unique sound information of a danger occurrence notification sound certified by a public institution, which has to be newly registered through an application installed in the main body of a device to which the earphone is connected, is automatically updated.

And the comparing unique sound information of an identified danger occurrence notification sound with the sound information registered in the danger occurrence notification sound information registration unit and determining the degree of matching sets the magnitude of a setting value for maintaining and blocking the ANC function differently by entering volume and genre information of a sound currently output through an earphone; age and hearing capability information of an earphone user; residential environment information; brainwave information to a danger occurrence notification sound to which the user responds; and health status information.

And the method further includes determines whether an earphone malfunctions in a standby state in which sound transmission of the earphone is temporarily stopped.

When it corresponds to the actual occurrence of a danger in the standby state in which sound transmission of the earphone is temporarily stopped, an earphone OFF signal is entered, and the earphone is turned off; when the earphone OFF signal is not entered even after a set time is elapsed, it is determined that a malfunction has occurred, and sound transmission is resumed automatically.

As described above, an earphone with an ANC automatic blocking function according to the present disclosure and a method for controlling the same provides the following effects.

First, safety may be improved by automatically canceling the ANC function using unique sound information of a danger occurrence notification sound when the danger occurrence notification sound is generated from the outside during the operation of the ANC function.

Second, even if a user wears an earphone with a noise canceling function, the noise canceling function is automatically turned off when a danger occurrence notification sound is collected; thus, the user may efficiently and quickly respond to the danger occurrence notification sound at the occurrence of a disaster.

Third, when a danger occurrence notification sound is collected at the occurrence of a disaster, the noise canceling function is automatically turned off. Thus, a user may evacuate the disaster situation or follow the instructions of a fire safety manager in response to the danger occurrence notification sound; thereby, the present disclosure prevents the possibility of casualties beforehand.

Fourth, the present disclosure improves technical reliability by verifying, through an EEG experiment, the ANC automatic blocking function and a process for responding to a danger based on the pattern of brainwaves to a danger occurrence notification sound to which a human responds through an EEG experiment.

Fifth, the present disclosure allows accurately extracting unique sound information (magnitude, frequency, and waveform) of a danger occurrence notification sound reflecting human psychology through a scientific and quantitative result based on actual fire situation settings and brainwave measurements and allows the extracted information to be used as reference data when related laws are enacted and revised.

DETAILED DESCRIPTION

In what follows, preferred embodiments of an earphone with an ANC automatic blocking function and a method for controlling the same according to the present disclosure will be described in detail.

Characteristics and advantageous effects of an earphone with an ANC automatic blocking function and a method for controlling the same according to the present disclosure will be clearly understood from detailed descriptions of the respective embodiments below.

Figure 1:
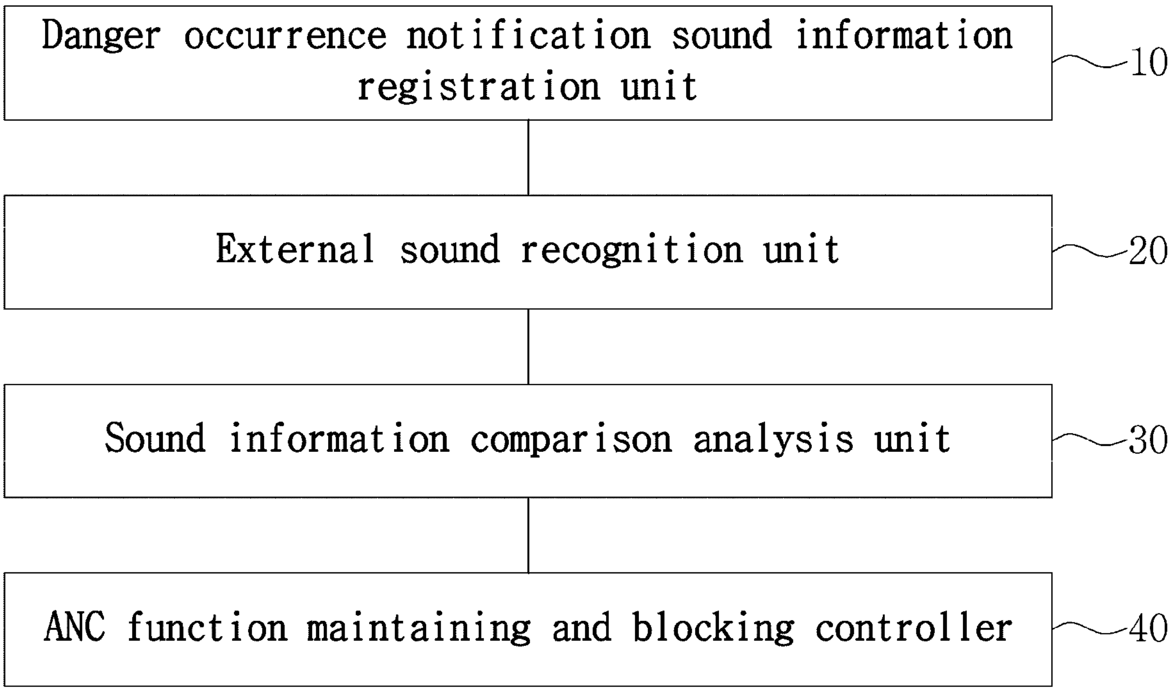
FIG. 1 is a block diagram illustrating the structure of an earphone device with an ANC automatic blocking function according to the present disclosure.

FIG. 1 is a block diagram illustrating the structure of an earphone device with an ANC automatic blocking function according to the present disclosure.

Terms used in the present disclosure have been selected as much as possible from general terms relevant to the functions of the present disclosure and currently in wide use; however, the selection of terms may be varied depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

Throughout the document, unless otherwise explicitly stated, if a particular element is said to "include" some particular element, it means that the former may further include other particular elements rather than exclude them. The term "unit" or "module" used in the document refers to a base unit for processing at least one function or operation, which may be implemented by hardware or software or a combination of both.

An earphone with an ANC automatic blocking function and a method for controlling the same according to the present disclosure improves safety by automatically canceling the ANC function using unique sound information of a danger occurrence notification sound when the danger occurrence notification sound is generated from the outside during the operation of the ANC function.

To this end, the present disclosure may include configurations in which, even when a user wears an earphone with a noise-canceling function, the noise-canceling function is automatically turned off if a danger occurrence notification sound is collected, and the user may respond efficiently and quickly to the occurrence of a disaster.

The present disclosure may include configurations for improving technical reliability by verifying, through an EEG experiment, the ANC automatic blocking function and a process for responding to a danger based on the pattern of brainwaves to a danger occurrence notification sound to which a human responds.

The present disclosure may include configurations that allow accurately extracting unique sound information (magnitude, frequency, and waveform) of a danger occurrence notification sound reflecting human psychology through a scientific and quantitative result based on actual fire situation settings and brainwave measurements.

In what follows, the "danger occurrence notification sound" may include, but not limited to, alarm sounds (e.g., a fire alarm, a disaster warning, an air raid warning, or a medical equipment alarm), warning sounds (horn blowing sounds of a vehicle such as a car, a bus, a bicycle, and a personal mobility platform; siren sounds of a police car or an ambulance; reverse driving sounds; failure alarms of industrial machines; failure alarms of household products; and a notification sound of danger (overheating of an induction oven, a gas range, and a microwave oven), and human and animal sounds (shouting or barking).

And the "sound information" includes, but not limited to, magnitude, frequency, and waveform information.

As shown in FIG. 1, an earphone with an ANC automatic blocking function according to the present disclosure comprises a danger occurrence notification sound information registration unit 10 registering and storing unique sound information of a danger occurrence notification sound certified by a public institution, where the unique sound information includes magnitude, frequency, and wave information of the danger occurrence notification sound; an external sound recognition unit 20 recognizing an external sound during operation of an ANC function; a sound information comparison analysis unit 30 comparing sound information recognized by the external sound recognition unit 20 with sound information registered in the danger occurrence notification sound information registration unit 10 and analyzing and determining whether matching sound information exists; and an ANC function maintaining and blocking controller 40 blocking the ANC function immediately when it is determined from an analysis result of the sound information comparison analysis unit 30 that there exists sound information matching the sound information recognized by the external sound recognition unit 20.

Here, the danger occurrence notification sound information registration unit 10 and the sound information comparison analysis unit 30 may be installed in the earphone itself or installed in the main body of a device to which the earphone is connected and are driven by an application installed in the main body of the device.

Also, unique sound information of a danger occurrence notification sound certified by a public institution, which has to be newly registered through an application installed in the main body of a device, may be automatically updated.

It should be clearly understood that constituting units for implementing the functions above may also be implemented in other forms without being limited to the specific forms described above.

And the sound information comparison analysis unit may set the magnitude of a setting value for maintaining and blocking the ANC function differently by entering volume and genre information of a sound currently output through an earphone; age and hearing capability information of an earphone user; residential environment information; brainwave information to a danger occurrence notification sound to which the user responds; and health status information.

As described above, since the magnitude of the setting value for ANC function maintaining and blocking are set differently for each user, responding to an emergency may be performed efficiently according to the user's current status.

In general, when a danger occurrence notification sound is transmitted while a user wears an earphone with an active noise-canceling function, the transmitted sound is recognized as an ambient noise.

At this time, even if the active noise-canceling function is activated, if a danger occurrence notification sound is heard from external background noise, unique sound information including the magnitude, frequency, and wave information of the danger occurrence notification sound is caught, and operation of the noise-canceling function is autonomously stopped.

On the other hand, since all danger occurrence notification sounds have to be certified by the Korea Fire Institute (KFI), the unique sound information (magnitude, frequency, waveform, and the like) may be stored in a DB and identified based on the sound information stored therein.

Also, through analysis of EEG experimental results, a user's natural physiological response when wearing ANC earphones is checked, and reliability is secured by verifying whether a reaction or decision-making occurs in response to an actual danger occurrence notification sound.

In what follows, a method for controlling an earphone with an ANC automatic blocking function according to the present disclosure will be described in detail.

Figure 2:
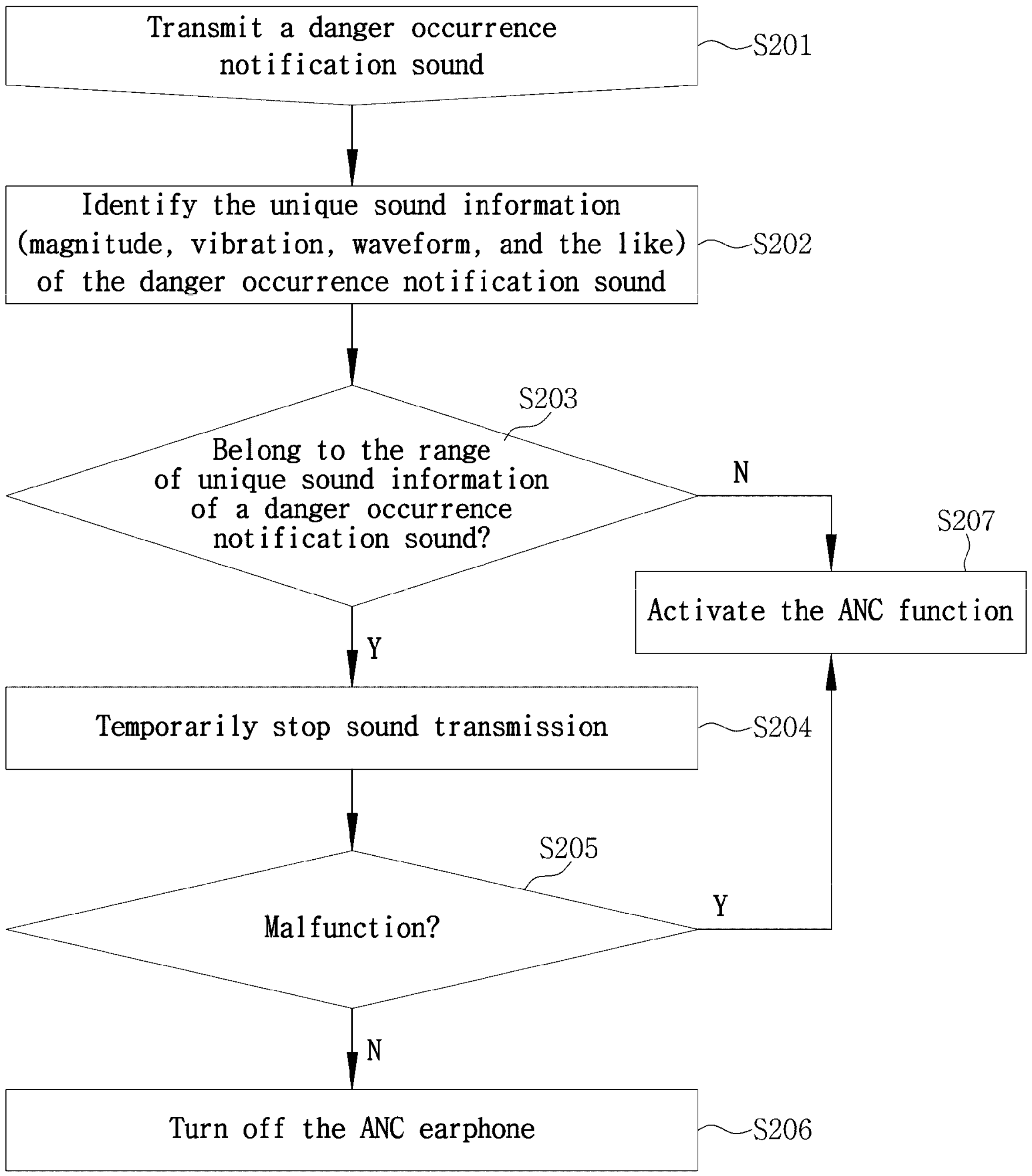
FIG. 2 is a flow chart illustrating a method for controlling an earphone with an ANC automatic blocking function according to the present disclosure.

FIG. 2 is a flow chart illustrating a method for controlling an earphone with an ANC automatic blocking function according to the present disclosure.

First, when a danger occurrence notification sound is transmitted from the outside S201, the external sound recognition unit 20 recognizes the transmitted sound and identifies unique sound information (magnitude, frequency, waveform, and the like) of the danger occurrence notification sound S202.

Next, the unique sound information of a danger occurrence notification sound identified by the sound information comparison analysis unit 30 is compared with the sound information registered in the danger occurrence notification sound information registration unit 10, and the degree of matching between them is determined S203.

When the degree of matching does not lie within a set range, the ANC function of the earphone is maintained to be in operation S206, and sound transmission of the earphone is temporarily stopped when the degree of matching lies within the set range S204.

Next, it is determined whether the earphone malfunctions in a standby state in which sound transmission of the earphone is temporarily stopped S205.

When an earphone OFF signal is entered, it is determined that the earphone is in normal operation and turned off S206; when it is determined that a malfunction has occurred, the ANC function is maintained to be in operation S207.

As described above, the present disclosure allows turning on/off the earphone selectively by considering a malfunction situation.

Here, a malfunction refers to a case in which the earphone temporarily stops operation due to a mechanical defect or a case in which an ambient noise sound lies similarly in the range of the unique sound information of a danger occurrence notification sound but not in a dangerous or emergency situation.

When it corresponds to the actual occurrence of a danger in the standby state in which sound transmission of the earphone is temporarily stopped, an earphone OFF signal is entered to turn off the earphone; when the earphone OFF signal is not entered even after a set time is elapsed, it is determined that a malfunction has occurred, and sound transmission is resumed automatically.

As described above, an earphone with an ANC automatic blocking function and a method for controlling the same according to the present disclosure automatically turns off the noise canceling function when a danger occurrence notification sound is collected. Thus, a user may evacuate the disaster situation or follow the instructions of a fire safety manager in response to the danger occurrence notification sound; thereby, the present disclosure prevents the possibility of casualties beforehand.

As described above, it should be understood that the present disclosure may be implemented in various other modified forms without deviating from the inherent characteristics of the present disclosure.

In this respect, the disclosed embodiments should be taken into account in a descriptive point of view rather than restrictive point of view. The technical scope of the present disclosure should be judged by the appended claims rather than the descriptions given above, and all of the discrepancies which may be found within the range equivalent to the technical scope of the present disclosure should be interpreted to belong thereto.

DESCRIPTION OF SYMBOLS

10: Danger occurrence notification sound information registration unit
20: External sound recognition unit
30: Sound information comparison analysis unit
40: ANC function maintaining and blocking controller

What is claimed is:

1. An earphone with an Active Noise Control (ANC) automatic blocking function comprising:

a danger occurrence notification sound information registration unit registering and storing unique sound information of a danger occurrence notification sound certified by a public institution;

an external sound recognition unit recognizing an external sound during operation of an ANC function;

a sound information comparison analysis unit comparing sound information recognized by the external sound recognition unit with sound information registered in the danger occurrence notification sound information registration unit and analyzing and determining whether matching sound information exists; and an ANC function maintaining and blocking controller blocking the ANC function immediately when it is determined from an analysis result of the sound information comparison analysis unit that there exists sound information matching the sound information recognized by the external sound recognition unit, wherein the sound information comparison analysis unit sets a magnitude of a setting value for maintaining and blocking the ANC function differently by entering volume and genre information of a sound currently output through an earphone; age and hearing capability information of an earphone user; residential environment information; brainwave information to a danger occurrence notification sound to which the user responds; and health status information, wherein the danger occurrence notification sound information registration unit, the external sound recognition unit, and the sound information comparison analysis unit are each implemented by hardware, software, or a combination thereof.

2. The earphone of claim 1, wherein the danger occurrence notification sound information registration unit and the sound information comparison analysis unit are installed in the earphone itself or installed in a main body of a device to which the earphone is connected and is driven by an application installed in the main body of the device.

3. The earphone of claim 2, wherein unique sound information of a danger occurrence notification sound certified by a public institution, which has to be newly registered through the application installed in the main body of the device, is automatically updated.

4. The earphone of claim 1, wherein the sound information includes magnitude information, frequency information, and waveform information.

5. The earphone of claim 1, wherein the sound information comparison analysis unit, configured to determine whether the sound information recognized by the external sound recognition unit matches the sound information registered in the danger occurrence notification sound information registration unit, sets a range for determining a degree of matching and determines that the two pieces of sound information match when the degree of matching lies within the set range.

6. A method for controlling an earphone with an Active Noise Control (ANC) automatic blocking function, the method comprising:

identifying unique sound information of a danger occurrence notification sound by recognizing the danger occurrence notification sound by an external sound recognition unit when the danger occurrence notification sound is transmitted from outside the earphone while the ANC function of the earphone is in use;

comparing unique sound information of a danger occurrence notification sound identified by a sound information comparison analysis unit with the sound information registered in a danger occurrence notification sound information registration unit and determining a degree of matching;

maintaining the ANC function of the earphone to be in operation when the degree of matching does not lie within a set range and temporarily stopping sound transmission of the earphone when the degree of matching lies within the set range, wherein the comparing unique sound information of an identified danger occurrence notification sound with the sound information registered in the danger occurrence notification sound information registration unit and determining the degree of matching sets a magnitude of a setting value for maintaining and blocking the ANC function differently by entering volume and genre information of a sound currently output through an earphone; age and hearing capability information of an earphone user; residential environment information; brainwave information to a danger occurrence notification sound to which the user responds; and health status information.

7. The method of claim 6, wherein the sound information includes magnitude information, frequency information, and waveform information.

8. The method of claim 6, wherein unique sound information of a danger occurrence notification sound certified by a public institution, which has to be newly registered through an application installed in a main body of a device to which the earphone is connected, is automatically updated.

9. The method of claim 6, further including determining whether an earphone malfunctions in a standby state in which sound transmission of the earphone is temporarily stopped.

10. The method of claim 9, wherein, when it corresponds to the actual occurrence of a danger in the standby state in which sound transmission of the earphone is temporarily stopped, an earphone OFF signal is entered to turn off the earphone, and when the earphone OFF signal is not entered even after a set time is elapsed, it is determined that a malfunction has occurred, and sound transmission is resumed automatically.

* * * * *